United States Patent
Moore et al.

[11] Patent Number: 4,548,228
[45] Date of Patent: Oct. 22, 1985

[54] CHEMICAL FEEDER

[76] Inventors: Stephen D. Moore, 1230-17th Ave., N. Lake Worth, Fla. 33460; Murrill Maglio, 305 Cypress Ave., West Palm Beach, Fla. 33406

[21] Appl. No.: 537,791

[22] Filed: Sep. 30, 1983

Related U.S. Application Data

[63] Continuation of Ser. No. 212,105, Dec. 2, 1980, Pat. No. 4,407,322.

[51] Int. Cl.⁴ .................................... B01D 11/02
[52] U.S. Cl. .................... 137/268; 422/276; 422/281
[58] Field of Search ............... 137/268, 205.5, 101, 137/564.5; 422/261, 264, 252, 276, 281

[56] References Cited
U.S. PATENT DOCUMENTS

| | | | |
|---|---|---|---|
| 2,493,870 | 1/1950 | Hartwick | 137/268 X |
| 2,989,979 | 6/1961 | Karlson | 137/268 |
| 3,056,419 | 10/1962 | Westman | 137/268 X |
| 3,578,776 | 5/1971 | Schneider | 137/268 |
| 3,710,817 | 1/1973 | Lorenzen | 137/268 |
| 3,864,090 | 2/1975 | Richards | 137/268 X |

*Primary Examiner*—Alan Cohan
*Attorney, Agent, or Firm*—Finnegan, Henderson, Farabow, Garrett & Dunner

[57] ABSTRACT

A device for controlled feeding of a water-soluble chemical into a water line having a pressure varying between a minimum and a maximum in the line. Water flows from the water line into an air impervious chemical mixing tank through a first one-way check valve. When the pressure in the line is less than the air pressure in the tank, an air reservoir in the mixing tank forces the mixture of water and chemical back into the water line through a control valve which is set at a restricted flow value with respect to the first check valve. A second one-way check valve located in the water line between the one-way check valve and the control valve prevents the contents of the mixing tank fed through the control valve from backing up toward the first one-way check valve.

2 Claims, 7 Drawing Figures

CHEMICAL FEEDER

This is a continuation of application Ser. No. 212,105, filed Dec. 2, 1980, now U.S. Pat. No. 4,407,322, issued Oct. 4, 1983.

BACKGROUND OF THE INVENTION

The present invention relates to a chemical feeder. More specifically, the present invention relates to a chemical feeder which has no moving parts and is useful for the controlled feeding of a water-soluble chemical into a water line wherein the pressure varies between a maximum and a minimum.

Chemical treatment of water, including removal of undesirable sulphur odors, is often necessary. To accomplish this treatment, various devices in the art seek to feed controlled amounts of a water-soluble chemical into a water line. Disadvantageously, however, these devices are generally complicated, requiring moving parts subject to wear, which thus must be frequently replaced. There is, therefore, a need in the art for an uncomplicated device for the controlled feeding of a water-soluble chemical into a water line which does not include parts subject to extreme wear.

SUMMARY OF THE INVENTION

The present invention overcomes the problems and disadvantages of the prior art by providing a device for controlled feeding of a water-soluble chemical into a water line having a pressure varying between a minimum and a maximum in the line comprising an input coupling to the water line; a first check valve means for preventing flow back through the input coupling; an output coupling downstream from the input coupling; air impervious chemical mixing tank means providing fluid communication between the input and output couplings; and means for creating a pressure differential between the mixing tank means and the output coupling. The invention further includes a second check valve located in the water line between the input coupling and the output coupling for preventing the contents of the mixing tank fed through the output coupling from backing up toward the input coupling.

The accompanying drawings, which are incorporated in and constitute a part of the specification, illustrate various preferred embodiments of the invention and, together with the description, serve to explain the principles of the invention.

DESCRIPTION OF THE PREFERRED EMBODIMENTS

In private wells, water pressure commonly varies 20 to 30 pounds per square inch (p.s.i.) between the low pressure point where the well pump starts and the high pressure point where the well pump stops. The present invention utilizes this pressure differential to create an air reservoir inside an air impervious mixing tank of a chemical feeder for introducing controlled amounts of chemical into a water line whenever the pressure in the line is less than the air pressure in the mixing tank. Because the pressure differential between the mixing tank and the water line is utilized for the controlled feeding, no additional feed pump is required for the chemical feeding device of the present invention.

Reference will now be made in detail to the presently preferred embodiments of the invention, examples of which are illustrated in the accompanying drawings.

Figure 1:
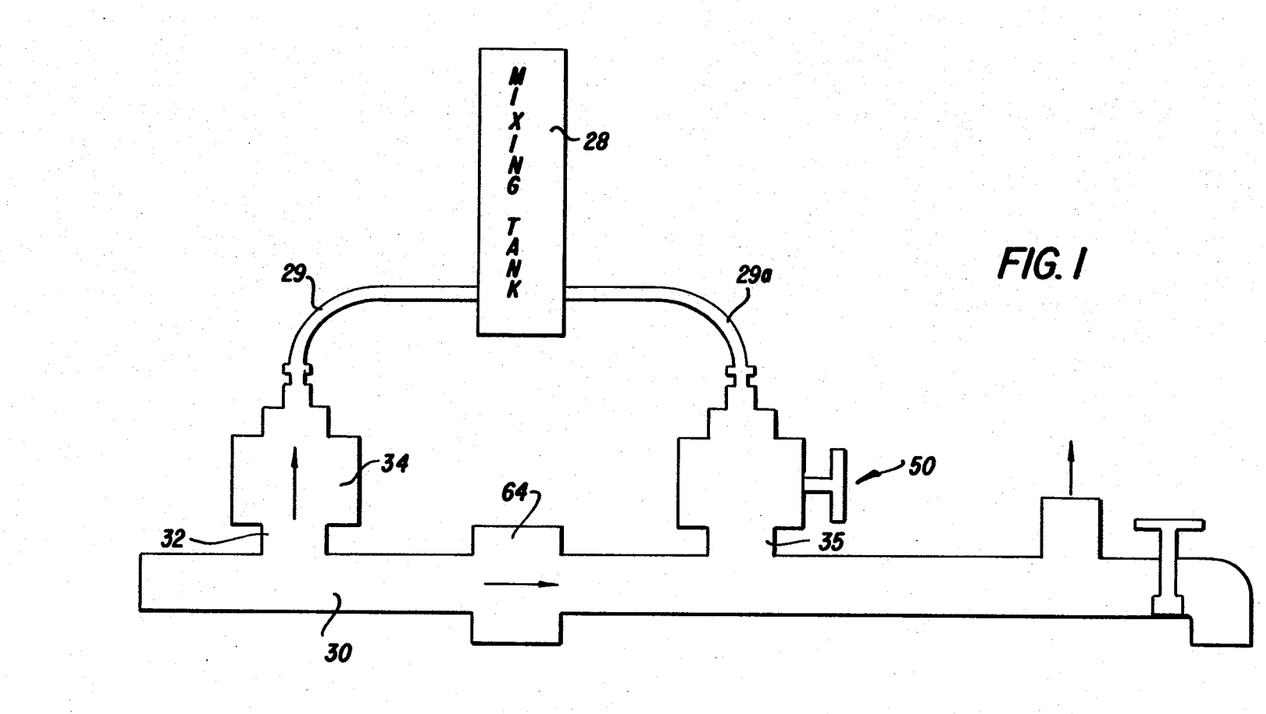
FIG. 1 is a schematic diagram of an apparatus for coupling the mixing tank of the chemical feeder of the invention to a water line.

As shown in the diagram of FIG. 1, the device of the invention for controlled feeding of a water-soluble chemical into a water line includes air impervious chemical mixing tank means providing fluid communication between input and output couplings to the water line. As embodied herein, the mixing tank 28 is coupled to the main water line 30 by lines 29, 29a between an input coupling 32 and an output coupling 35 downstream from the input coupling. The invention is especially adapted to control the feeding of a water-soluble chemical from the mixing tank into a water line having a pressure varying between a minimum pressure, which turns on a pump, (not shown) and a maximum pressure, which turns the pump off, as is well-known in the art.

A check valve 34 in the input line 29 prevents backflow of water through the line 29 into the main water line 30. To prevent over-concentration of chemical flowing from the feeder, it is preferred that a second check valve 64 be installed in the main water line 30 between the input coupling 32 and the output coupling 35 to prevent any backflow of water-containing chemical through the main water line and back into the input coupling 32 during periods when the pump is not operating. The check valves 34, 64 may be any appropriate conventional type of one-way valve.

In accordance with the invention, the controlled chemical feeder includes means for creating a pressure differential between the mixing tank means and the output coupling. As embodied herein, the means for creating a pressure differential between the mixing tank means 28 and the output coupling 35 includes a valve 50 in the output line 29a for restricting the flow of fluid through the output line and the output coupling into the main water line 30, having a varying water pressure.

Figure 2:
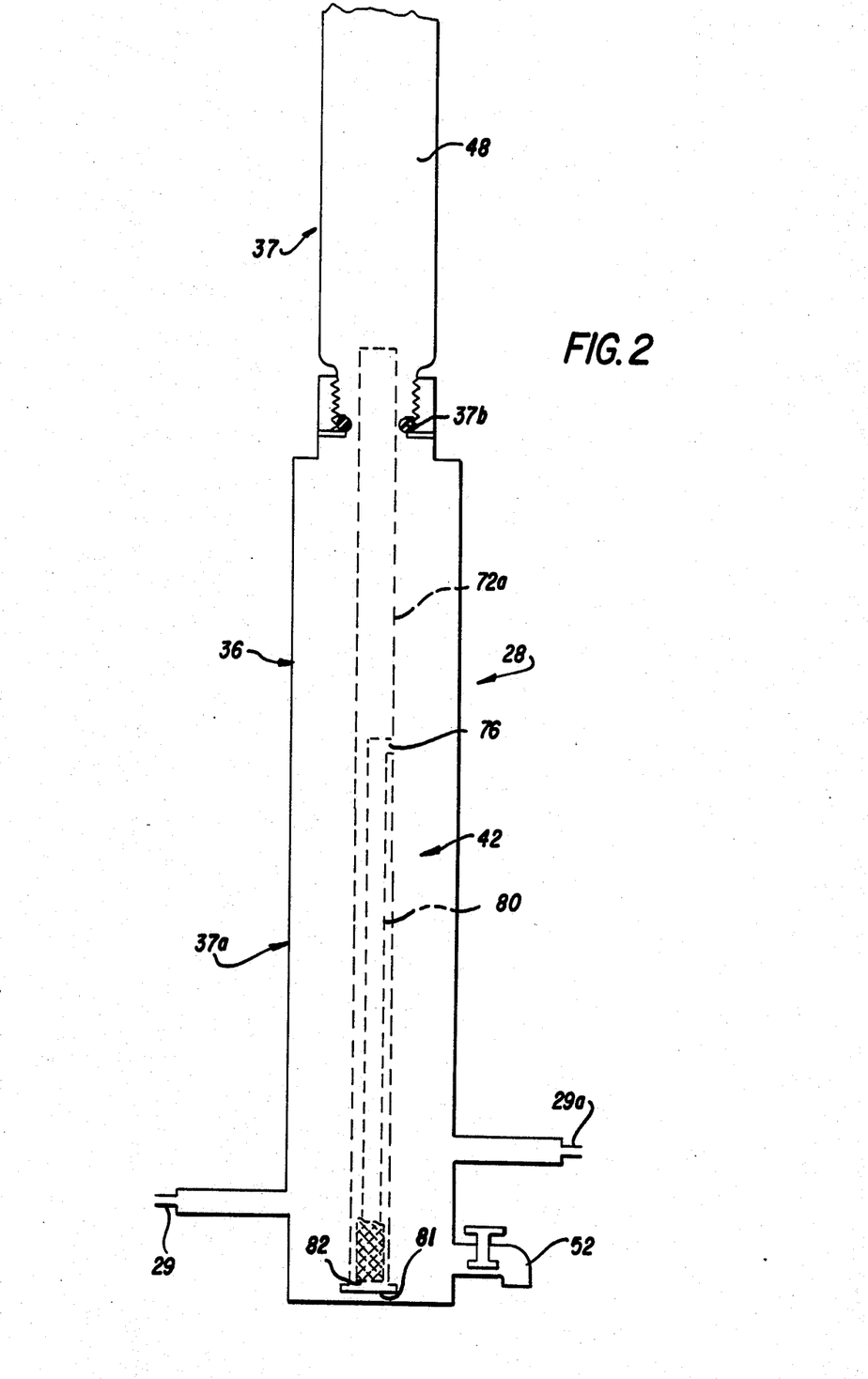
FIG. 2 is a schematic diagram of one embodiment of the mixing tank of the present invention.

Referring to FIGS. 1 and 2, in accordance with the invention, the mixing tank means includes an elongated vertical cylinder 36, and chemical storage means 72a and a chemical and water mixing chamber 42 within the cylinder, the fluid communication including passage means 80 through the chemical storage means 72a into the mixing chamber 42. As embodied herein, the elongated vertical cylinder 36 is divided into sealingly engageable upper and lower sections 37 and 37a, respectively, which are threaded together. An O-ring or rubber gasket 37b may be conveniently used to render the engagement of upper and lower sections 37 and 37a airtight. Preferably, the cylinder 36 is made of polyvinyl chloride.

As embodied herein, the pressure differential creating means also include an air reservoir 48 in the cylinder 36 which is subject to the varying pressure in the water line 30 and which acts on the contents of the cylinder 36. The air reservoir 48 is primarily in the upper section 37. As stated previously, the pressure differential creating means also include control valve 50 between the cylinder 36 and the output coupling 35. The control valve 50 is set at a restricted flow valve with respect to the input coupling 32, whereby the air reservoir 48 feeds the contents of the cylinder 36 containing a mixing of water and chemical through the control valve 50 when the water pressure in the water line 30 varies below the air pressure in the reservoir.

In operation, water flows into the cylinder 36 through the input coupling 32, check valve 34 and inlet water line 29 until the air pressure in the reservoir 48 equals the water pressure in the line 30. After solubilizing the chemical in the container 72a mixing in the chemical and water mixing chamber 42, the water leaves the cylinder 36 through output coupling 35 and control valve 50. A filter, not shown, may be employed in the lower section 37a of the cylinder 36 to keep floating solid material from entering control valve 50.

Because only a small amount of chemically treated water is required to be introduced into the main water line 30, control valve 50 is set at a restricted flow value with respect to the input coupling 32. As water is used from the water line 30, the pressure in the line drops. The air pressure inside the cylinder 36, however, remains higher because of the restricted flow value of the control valve 50. The resulting pressure differential forces the water through the conrtrol valve 50 into the line 30. At times, the air pressure in the reservoir 48 and the water pressure in the water line 30 are equal and the chemical feeder stops. As soon, however, as a water tap is opened, the water line pressure drops and the chemical resumes feeding.

It may be desirable to install a holding tank, not shown, in the water line 30 after the output coupling 35 to average out the concentration of chemical in the water and offset any variation of chemical feed into the water caused by varying pressures and varying rates of flow. Moreover, in the case of feeding chlorine, a charcoal filter, not shown, may be employed downstream from the output coupling 35 to remove any excess chlorine.

The embodiment of the chemical feed control device of FIG. 2 utilizes a somewhat simplified version of the mixing tank. As embodied in FIG. 2, the water input from coupling 32 flows directly into the chemical and water mixing chamber 42 of mixing tank 28. An elongated vertical container 72a, where the chemical is located, extends from near the bottom of the lower section 37a into the upper section 37. A tube 80, substantially concentric with the container 72a, extends from near the bottom portion of the container to an aperture 76 in the container, the rim of the tube being sealed to the edge of the aperture. If desired, a filter 82 may be inserted between the bottom of the tube 80 and the bottom 81 of the container 72a.

As the water levels vary in the chemical and water mixing chamber 42 and in the elongated vertival container 72a, both the inlet and outlet of water into and from the elongated vertical container 72a pass through the bottom of the elongated vertical container 72a, thus ensuring a constant mixture of chemical. When the water level in the chemical and mixing chamber 42 is rising, water enters the container 72a through the aperture 76, passes through the tube 80 and filter 82, and mixes with the solid chemical. When the water level in the container 72a and chemical and water mixing chamber 42 is falling, the water, containing dissolved chemical, passes back out through filter 82, tube 80 and aperture 76 into chemical and water mixing chamber 42 and out of cylinder 36 through output coupling 35 and control valve 50.

Figure 3:
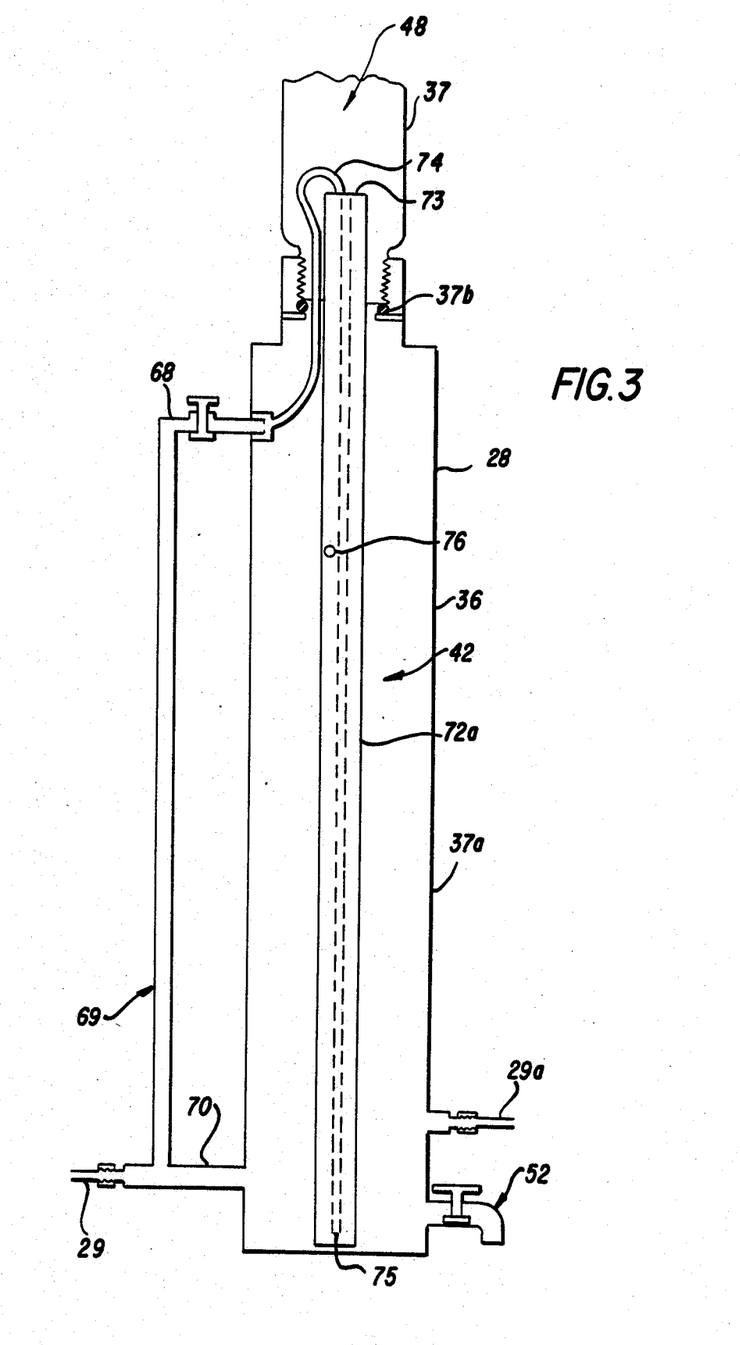
FIG. 3 is a schematic diagram of a second embodiment of the mixing tank of the present invention.

The embodiment shown in FIG. 3 is similar to the embodiment of FIG. 2 in many respects and like elements bear the same reference numerals. In the embodiment of FIG. 3, the mixing tank 28 includes an elongated vertical cylinder 36 which is divided into sealingly engageable upper and lower sections 37 and 37a, respectively.

In accordance with the invention, the mixing tank 28 includes means for directing a portion of the water flowing through the input coupling 32 to a second control valve 68. As embodied herein, the latter means includes water bypass 69.

The mixing tank 28 also includes, in accordance with the invention, means for directing a second portion of the water flowing through the input coupling 32 into the chemical and water mixing chamber 42. As embodied herein, the latter means include secondary water inlet 70.

As embodied in mixing tank 28, the chemical storage means includes an elongated vertical container 72a located within the chemical and water mixing chamber 42. A solid, water-soluble chemical useful for water treatment is contained within container 72a. Preferably, container 72a is a cylinder and the top 73 of the container 72a is above the high water level within cylinder 36.

A water injection tube 74 is in fluid communication with the second control valve 68 and extends to the inside bottom portion 75 of container 72a. Thus, the portion of water allowed to flow through water injection tube 74 by second control valve 68 mixes with the solid chemical at the bottom portion 75 of the container 72a. Since the amount of water which flows through container 72a is controlled by second control valve 68, the concentration of the liquid chemical inside the cylinder 36 is increased by opening second control valve 68 and decreased by closing second control valve 68.

The container 72a also contains an aperture 76 for discharge of water containing the dissolved chemical. Preferably, the aperture is always below the varying levels of water in the cylinder 36 under the varying water pressure.

The liquid level inside elongated vertical container 72a and the liquid level inside elongated vertical cylinder 36 are at substantially the same height, except when water is entering the cylinder 36 and the container 72a. As the water level in both the cylinder 36 and the container 72a drops, however, water containing dissolved chemical flows through the aperture 76 and mixes with the raw water in the chemical and water mixing chamber 42 and then flows out of the cylinder 36 through the output coupling 35 and the first control valve 50.

Use of container 72a, second control valve 68 and water injection tube 74 advantageously reduces the amount of undissolved solid chemical in the chemical storage chamber 72a, promotes mixing of the chemical with the water, and also allows for better control of the degree of concentration of the chemical.

It has been found that when HTH chlorine is used as a solid chemical in the embodiment of the invention featured in FIG. 3, the concentration of chemicals inside the cylinder 36 remains more constant if the aperture 76 of the elongated vertical container 72a is below the lower water level at all times. However, aperture 76 may be located above the lower water level in order to limit the concentration of chemical inside cylinder 36.

Figure 4:
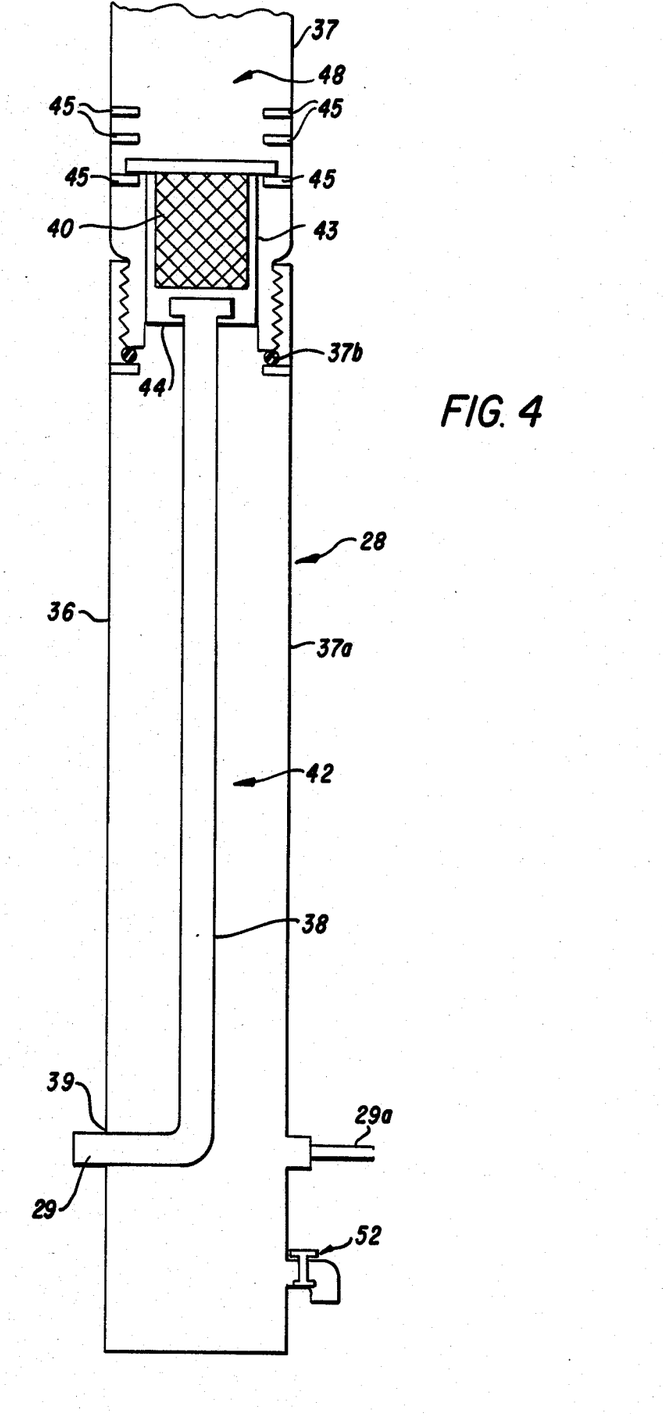
FIG. 4 is a schematic diagram of another embodiment of the mixing tank of the present invention which is suitable for use without the coupling apparatus.

The embodiment shown in FIG. 4 is similar to the embodiment of FIG. 2 in many respects, and like elements bear the same reference numerals. In the embodiment of FIG. 4, the chemical storage means includes a basket 40 in which a solid water-soluble chemical is placed. The elongated vertical cylinder 36 also includes a chemical and water mixing chamber 42.

In the embodiment of FIG. 4, fluid communication through mixing tank 28 includes water inlet line 38, water feed cup 43 and an aperture 44 in the water cup which allows drainage of the cup when water is not flowing. This eliminates a saturated mixture. When fluid is moving into cup 43, it will mix with the chemical in basket 40 and overflow cup 43 into water mixing chamber 42.

The water inlet line 38 is coupled to line 29 through an aperture 39 in the lower section 37a of the cylinder 36, the line 38 being sealed into the aperture. The water line 38 extends upwardly through the mixing chamber 42 into the water cup 43, which is positioned in the upper section 37 of the cylinder 36.

The basket 40 is adjustably positionable within the feed water cup 43. In accordance with the invention, the cylinder 36 contains means for locating the basket 40 at different levels within the water cup 43. As embodied herein, the means for locating the basket 40 at different levels are the adjusters 45, such as studs fixed to the inner surface of the section 37.

Accordingly, if it is desired to dissolve greater amounts of chemical into the water, the basket 40 can be positioned on the adjusters 45 so that all or at least a portion of the basket is below the level of water in cup 43. The varying levels of water in cylinder 36 should always be below chemical feed cup 43 to allow proper drainage of the feed cup. Similarly, if it is desired to dissolve smaller amounts of chemical in the water, the basket 40 can be positioned on the adjusters 45 so that the entire basket 40 is inside feed cup 43.

In this embodiment, both the basket 40 and the mixing chamber 42 are subject to the pressure of air reservoir 48.

Solid chemicals useful for treating water, such as HTH chlorine (calcium hypochlorite) and trichloro-s-triazinetrione, can be used in all embodiments of the invention, although the latter will work best in the embodiment shown in FIG. 4, i.e. in basket 40, and the former works best in the embodiments shown in FIGS. 2, 3, 5 and 7. Further, liquid chemicals may be utilized in the embodiments of FIGS. 2, 3 and 5. Because the upper and lower sections 37 and 37a, respectively, of the cylinder 36 are sealingly engageable, the unit can be separated for reloading the chemical.

While reloading the chemical, the water must be shut off at the source, and a drain 52 opened to drain and clean out the cylinder 36. The upper section 37 is then removed, the basket 40 is filled with solid chemical and positioned again on the studs 45, and the upper section 37 is replaced. After the drain 52 is closed, the water may be turned back on at its source.

Figures 5, 6:
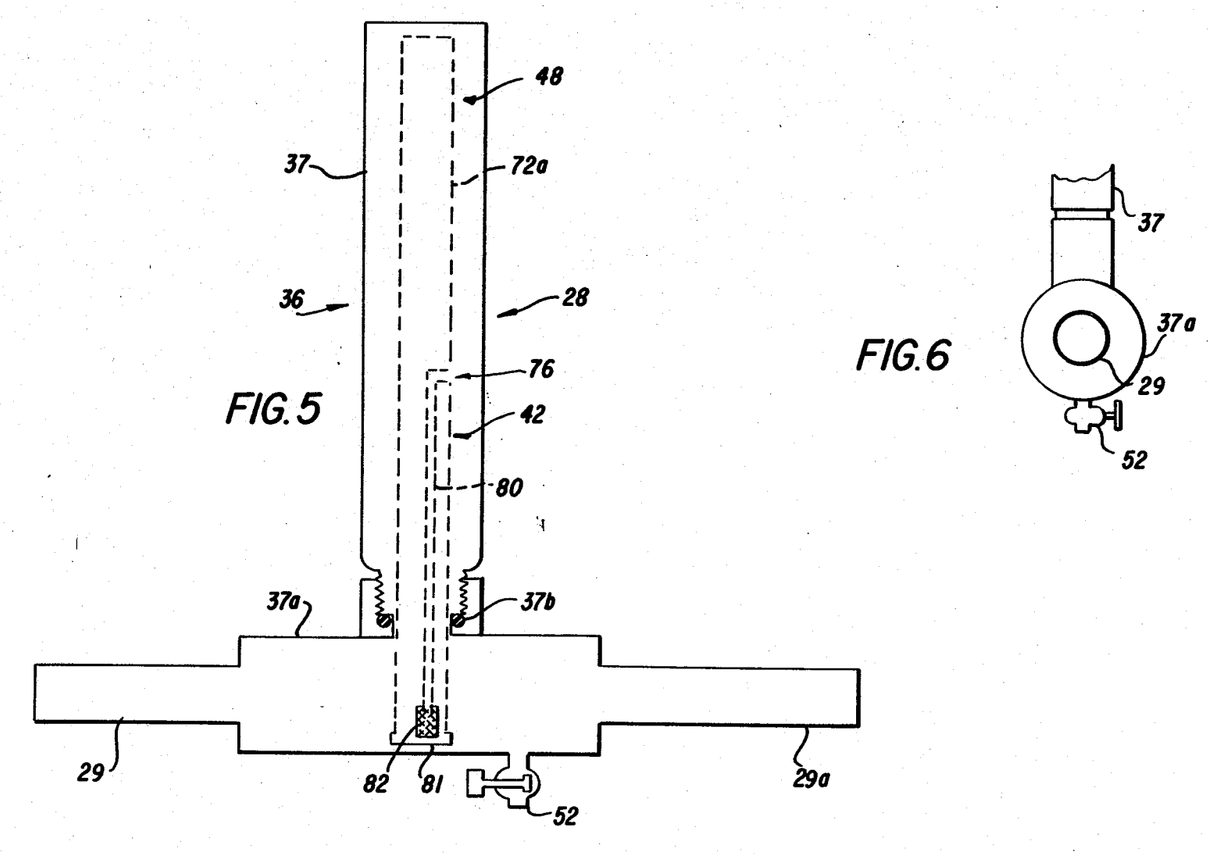
FIG. 5 is a schematic diagram of still another embodiment of the mixing tank of the present invention which is suitable for use without the coupling apparatus.
FIG. 6 is a diagrammatic end view of the embodiment of FIG. 5.

The embodiment of the mixing tank 28 shown in FIGS. 5 and 6 can be mechanically connected to water line 30 in the manner shown in FIG. 1 to form yet another embodiment of the invention. Although the mixing tank 28 is similar in some respects to the mixing tank shown in the other figures, in this embodiment the lower section 37a is not cylindrical, and the major portion of the container 72a is in the upper section 37.

When the embodiments shown in FIGS. 4 or 5 are being used without the coupling device of FIG. 1, it may be necessary, if a hose outlet is used upstream from line 29 and over-chlorination is occurring, to include a check valve in the water line 29 upstream from the input coupling line 29.

Figure 7:
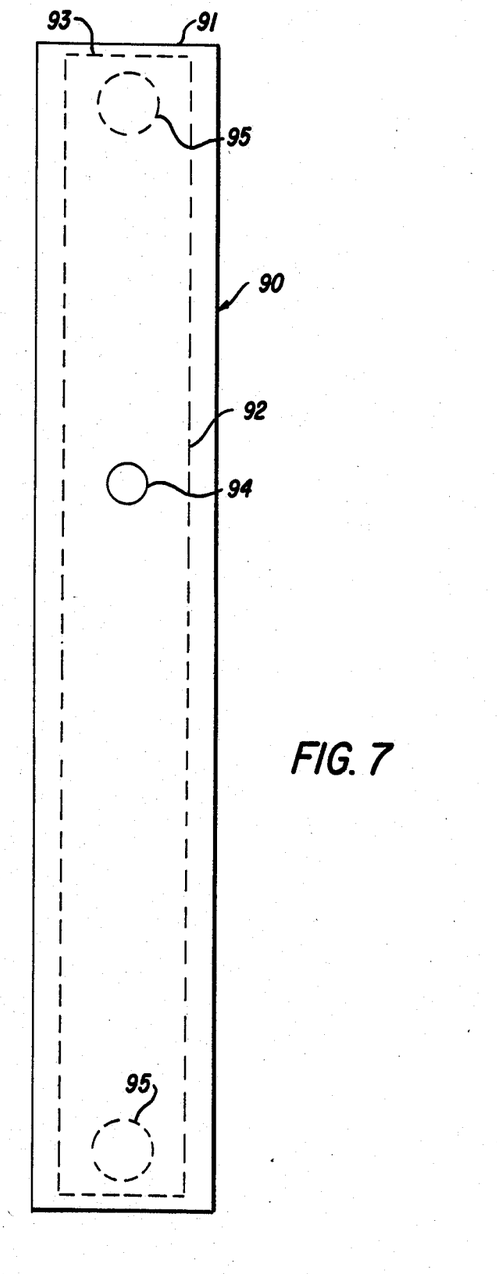
FIG. 7 is a schematic diagram of another embodiment of a container suitable for use in a mixing tank such as shown in FIGS. 2 and 5.

FIG. 7 illustrates an alternate embodiment of a container 90 suitable for use in a mixing tank 28 as shown in FIGS. 2 and 5. Container 90, shown in FIG. 7, may be used in lieu of container 72a, shown in FIGS. 2 and 5.

Container 90 comprises an elongated vertical tube of substantially circular cross section which is open at its upper end 91. Tube 92 is situated within, and substantially concentric with, container 90. Tube 92 extends substantially the entire length of container 90 and is open at its upper end 93. Solid chemical such as HTH chlorine is packed inside tube 92. Water enters container 90 via port 94 in the container wall when the water level in mixing chamber 42 exceeds the level at which port 94 is located. Thus, as in the embodiments shown in FIGS. 2 and 5, the liquid chemical concentration may be increased by sutuating port 94 at a lower level on the wall of container 90, and vice versa. Water from container 90 enters tube 92 via ports 95 located in the lower tube wall, and mixes with the solid chemical contained therein. To prevent clogging, it is preferable to construct tube 92 with a plurality of ports 95 at its lower end. Further, for ease in handling tube 92, and in order to make tube 92 insertable in container 90 in either direction, it is preferable to construct tube 92 with a plurality of ports 95 at both ends.

Except for the differences noted above, the functioning of container 90 in the chemical mixing tank of the present invention is similar to the functioning of container 72a, as shown and discussed in connection with FIGS. 2 and 5.

It will be apparent to those skilled in the art that various modifications and variations can be made in the embodiments of the present invention without departing from the scope or spirit of the invention. Thus, it is intended that the present invention cover the modifications and variations of this invention provided they come within the scope of the appended claims and their equivalents.

We claim:

1. A device for controlled, pressure-actuated feeding of a water-soluble chemical into a water line having a pressure varying between a minimum and a maximum in the line, comprising:

an input coupling to the water line;

a first check valve for preventing flow back through said input coupling;

an output coupling to the water line downstream from said input coupling;

fluid-tight chemical mixing tank means in fluid communication between said input and output couplings for permitting mixing of the chemical and the water therein, said mixing tank means including an elongated vertical cylinder divided into sealingly engageable upper and lower sections, chemical storage means, and a chemical and water mixing chamber, said storage means and said mixing chamber being situated within the cylinder, said fluid communication including fluid passage into said mixing chamber and through at least a portion of said chemical storage means during the chamber's filling cycle; and means for creating a pressure differential between said mixing tank means and said output coupling as a result of a decrease in the water pressure in the line below the maximum, thereby forcing chemical and water from said tank means into the line via said output coupling, said pressure differential creating means including an air reservoir situated in said mixing tank means and a control valve between said tank means and said output coupling, said control valve being set at a restricted flow value with respect to said input coupling, whereby the contents of said tank means are fed through said control valve by the pressure in said air reservoir acting on said contents when the water pressure in the water line decreases below the pressure in said air reservoir, both said chemical storage means and said mixing chamber being subject to the pressure of said air reservoir, wherein said air reservoir is primarily in said upper section and wherein said chemical storage means comprises an elongated vertical cylindrical contained closed at its bottom and an elongated vertical cylindrical tube positioned substantially concentrically within said container, said container extending from near the bottom of the mixing chamber upward through the lower section and into the upper section of said cylinder, said container having an aperture in the circumferential wall thereof lying within said lower section and adapted to be within the fluid of said chemical and water mixing chamber during a portion of each filling cycle of said chamber, and said tube having at least one perforation in its lower circumferential wall and said tube extending close to the bottom of said container.

2. A device for controlled, pressure-actuated feeding of a water-soluble chemical into a water line having a pressure varying between a minimum and a maximum in the line, comprising:

an input coupling to the water line for receiving the entire flow thereof;

a first check valve for preventing flow back through said input coupling;

fluid-tight chemical mixing tank means in fluid communication between said input coupling and the water line for permitting mixing of the chemical and the water therein, said mixing tank means including sealingly engageable upper and lower sections, at least one of said sections comprising an elongated vertical cylinder, chemical storage means, and a chemical and water mixing chamber, said storage means and said mixing chamber being situated at least partially within said cylinder, said fluid communication including fluid passage into said mixing chamber and through at least a portion of said chemical storage means during the chamber's filling cycle; and means for creating a pressure differential between said mixing tank means and said water line as a result of a decrease in the water pressure in the water line below the maximum, thereby forcing chemical and water from said mixing tank means into the water line, said pressure differential creating means including an air reservoir situated in the upper portion of said mixing tank means, whereby the contents of said tank means are fed to the water line by the pressure in said air reservoir acting on said contents when the water pressure in the water line decreases below the pressure in said air reservoir, both said chemical storage means and said mixing chamber being subject to the pressure of said air reservoir, said chemical storage means comprising an elongated vertical cylindrical container closed at its bottom and an elongated vertical cylindrical tube positioned substantially concentrically within said container, said container extending from near the bottom of the mixing chamber upward through the lower section and into the upper section of said cylinder; said container having an aperture in the wall thereof lying within said cylinder and adapted to be within the fluid of said chemical and water mixing chamber during a portion of each filling cycle of said chamber, and said tube having at least one perforation in its lower circumferential wall and said tube extending close to the bottom of said container.

* * * * *